Figures 1, 2:
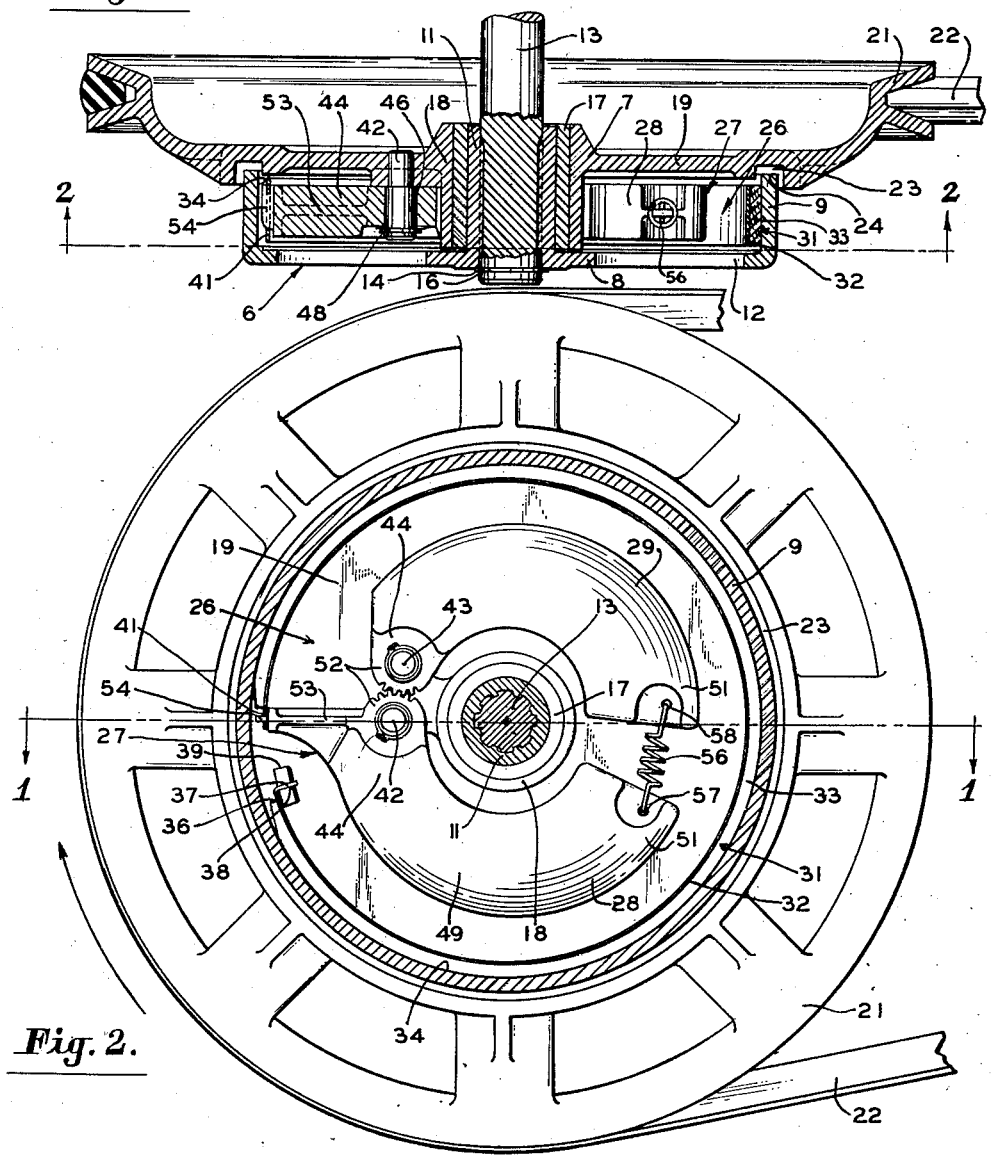

Aug. 4, 1953 T. R. SMITH 2,647,603
CENTRIFUGALLY OPERATED TORQUE LIMITING CLUTCH
Filed Sept. 12, 1951

Inventor
Thomas R. Smith

By
James K. Mosser
AGENT

Patented Aug. 4, 1953

2,647,603

UNITED STATES PATENT OFFICE 2,647,603

CENTRIFUGALLY OPERATED TORQUE LIMITING CLUTCH

Thomas R. Smith, Newton, Iowa, assignor to The Maytag Company, Newton, Iowa, a corporation of Delaware Application September 12, 1951, Serial No. 246,179

2 Claims. (Cl. 192—105)

The invention relates to torque limiting clutches, and more particularly to centrifugally operated torque limiting clutches.

In accordance with the invention, rotatable driving and driven members are provided with a clutch mechanism therebetween which includes an expansible clutch band and a centrifugally operated weight. The centrifugally operated weight is mounted on the driving member and it expands the clutch band after the driving member attains a predetermined speed to engage the driven member to drive the same. In this construction the mass of the weight is such that should an overload be placed on the driven member the clutch band will react to move the weight against centrifugal force to thereby reduce the contact pressure of the band. This action results in slippage between the clutch band and the driven member and puts a definite limit on the torque which can be transmitted through the clutch mechanism to protect the driving motor against overloading, both at starting and under normal operating conditions.

Accordingly, an object of the invention is to provide a rotatable driving member and a driven member with a centrifugally operated torque limiting clutch which limits the torque transmitted to a predetermined maximum value at any given speed of rotation of the driving member.

It is a further object of the invention to provide a rotatable driving member and driven member with a centrifugally operated torque limiting clutch which permits the driving member to start under no load condition and thereafter provides a coupling force between the members to limit the maximum load on the driving member at any given speed of rotation.

Other objects, features, capabilities and advantages are comprehended by the invention, as will later appear and as are inherently possessed thereby.

Referring to the drawings:

Figure 1 is a vertical cross sectional view taken along the line 1—1 in Figure 2 showing a portion of the improved clutch mechanism; and Figure 2 is a horizontal section view taken along the line 2—2 of Figure 1 showing the clutch mechanism in more detail.

Referring now in more detail to the drawings, an embodiment selected to illustrate the present invention, and shown in the figures, comprises a clutch structure 6 which includes a rotatable driving member 7 and a coaxial rotatable driven member 8. This driven member has a cylindrical drum 9 supported in spaced relation to a central hub portion 11 by means of an integral web 12. The hub portion 11 may have keyed or secured thereto, in any suitable manner, a rotatable driven shaft 13 which is restrained against axial disengagement by means of a snap ring 14 fitting within a groove 16 cut in the lower end of shaft 13. A sleeve or bearing 17 is mounted around the hub 11 for journaling the driving member 7. This driving member includes a central hub 18 journaled on the bearing 17, a generally flat plate or web 19 integrally formed with the hub 18 and a pulley 21 adapted to receive a belt 22 driven by means of any suitable source of power such as an electric motor (not shown).

An annular groove 23 formed in the lowerside of plate 19 loosely receives the upper end 24 of the cylindrical drum 9. Thus, it can be seen that the hub 18 and drum 9 along with the web 12 and plate 19 provide an annular space or pocket 26 for enclosing the improved centrifugally operated clutch mechanism 27. This particular clutch mechanism includes a pair of pivotally mounted centrifugally operated weights 28 and 29 and clutching means 31, all of which are carried by the lower wall of the plate 19 on the driving member 7. The clutching means comprises a generally cylindrical expansible clutch band 32 with a flexible lining 33 formed from friction material secured over the entire surface of its outer periphery. This lining is adapted to be moved into and out of engagement with the inner periphery or cylindrical surface 34 of the encompassing cylindrical drum 9 in a manner to be hereinafter described.

In order to prevent shifting of the clutch band 32 relative to the driving member 7, one end 36 of the band 32 is provided with a radially inwardly projecting portion or tab 37 which is received and anchored within a slot 38 in a lug or block 39 carried by the plate 19 on the driving member 7 adjacent the inner cylindrical surface 34 of the drum 9. The opposite or movable end 41 of the clutch band 32 is free to be moved in a direction to expand the lining 33 into engagement with the cylindrical wall 9 or to be moved in a direction to contract the lining 33 to reduce frictional contact with the wall 9 in a manner to be hereinafter described.

The centrifugally operated weights 28 and 29 for controlling the position of the movable end 41 of the clutch band 32 are pivotally mounted or journalled adjacent one of their ends of a pair of spaced parallel pins 42 and 43, respectively, which are preferably equally spaced from and parallel to the axis of rotation of the driving and driven members 7 and 8 and are rigidly secured to the plate 19.

The weights 28 and 29 each has a front or forward portion 44 with a bore 46 therethrough adapted to receive the stub portions of their respective supporting pins 42 and 43, and they are secured against axial displacement by means of snap rings 48. In addition each weight has an arcuate central body portion 49 extending from the forward portion 44 of the weight about, but spaced from, the coaxial hubs 11 and 18 and they terminate in rear or end portions 51 substantially opposite the forward portions 44 of the weights. Thus it can be seen that each weight has a forward portion 44 secured to the driving member 7, and a rear portion 51 free to move with respect to the driving member 7.

In order to provide means for insuring simultaneous movement of the two weights 28 and 29 to produce a net force substantially equal to the sum of their individual forces, the forward portion 44 of each weight is provided with a sector gear 52 held in mesh with the other by means of the pins 42 and 43 and it can be seen that with an arrangement of this type both the weights must move simultaneously, i. e., outward or inward movement of the rear portion 51 of one of the weights results in a corresponding movement of the other of the weights.

Projecting radially outward from the forward end 44 of the weight 28 is an arm or bell crank lever 53 which terminates adjacent the cylindrical surface 34 of the drum 9 and it is provided with a projecting pin or lug 54 to which is secured in any suitable manner the movable end 41 of the clutch band 32. Thus, it is obvious that if the free ends 51 of the weights move outwardly, the arm 53 moves the clutch band 32 in a direction to expand the same and, likewise, inward movement of the weights 28 and 29 moves the arm 53 in a direction to contract the clutch band.

In most installations it may be desirable to provide means acting on the weights 28 and 29 to cause the same to tend to return to their neutral position, corresponding to the unclutched position of the clutch band 32. The means for accomplishing this may include a tension type spring 56 having opposite ends 57 and 58 connected to the opposite weights 28 and 29, respectively, in any suitable manner. It being understood, of course, that the particular type of spring is immaterial and that the returning means need only act against one of the weights because they are geared together. A double weight construction of the type disclosed is of special utility where it is undesirable to have the inertia effect of the weights transferred to the clutch band 31 when the rotation of the driving member 7 is initiated or rapidly accelerated.

Referring now to the operation of the improved centrifugally operated clutch mechanism, and assuming the driving member 7 is stationary, the clutch lining 33 is out of contact with the driven drum 9 because the weights 28 and 29 have been returned to their inner or zero speed position by means of the spring 56. Even if the spring is not utilized there will be very little, if any, force available to hold the clutch lining 33 against the drum 9.

When the motor is energized the driving member 7 is, in this instance, rotated by means of the belt 22 in a clockwise direction, as shown by the solid arrow in Figure 2, and should the driven member 8 be connected to a load of any suitable type it will remain stationary, because there is very little or no solid connection between the driving and driven members.

Due to the position of the weights it is obvious the motor may or does start rotation under no load. After the starting winding for the motor is cut out or as the motor approaches a predetermined high speed corresponding to a safe speed for assuming the load on the driven member 8, centrifugal force acting on the weights carried by the driving member 7 overcomes the tension or loading of the spring 56 and their free or rear ends 51 begin to move outwardly. This outward movement of the free ends of the weights results in a pivotal movement of their forward ends 44 about their respective pivots and since the forward ends are geared together they must of necessity move simultaneously in opposite outward directions, and the net force transferred to the radial arm 53 would be the sum of that acting on both weights, neglecting, of course, frictional and other losses.

Since the outer end of the arm 53 is secured to the movable end 41 of the clutch band 32 and the other end 36 of the clutch band is anchored or fixed in position with respect to the driving member 7, any movement of the weights results in a corresponding movement of the clutch band. In this instance, the movement of the arm 53 is such as to expand the clutch band until the lining 33 engages the cylindrical wall of the driven drum 9. When this occurs the contact pressure of the clutch lining provides a drag against the driven drum and the driven member 8 begins to rotate. The clutching pressure is dependent upon the speed of rotation of the driving member 7, and the size and location of the weights 28 and 29 with respect to the axis of rotation of the assembly. Therefore, at any given speed of the driving member, the force exerted by the weights to force the clutch lining against the driven drum 9 is substantially constant if no overload is applied, and if the loading of the driven member 8 is less than this value the driving and driven members will rotate in unison.

Thus it can be seen that all torque is transmitted from the driving member to the driven member through the movable end 41 of the clutch band 32, and the force applied to the movable end of clutch band 32 is through the arm 53 and is proportional to the centrifugal force acting on the weights. Also, the movable end of the clutch band reflects an equal and opposite force on the arm 53 to maintain a state of equilibrium between the plate 19 of the driving member 7 and the centrifugal weights if no overload is applied on the driven member 8.

At any constant speed of rotation of the driving member 7 the torque transmitted will be limited to a predetermined maximum value, for if the load or torque to be transmitted tends to increase above this value, the movable end 41 of the clutch band 32 will be moved in a direction counter to the direction of rotation of the driving member, as shown in Figure 2, by a force exerted on the clutch band 32 through the driven drum. This action will physically move the arm 53, with the centrifugal weights 28 and 29 thereon, in a counter clockwise direction opposing the force acting on the weights to contract the clutch band 32 slightly to reduce a portion of the frictional pressure or engagement between the clutch lining 33 and the cylindrical surface 34 on the drum 9. This permits slippage between the driving and driven members and thereby limits the torque transmitted through the mechanism. As soon as the over-load is relieved, the arm 53 is moved by the weights to re-expand the clutch band 32 and the driving and driven members again rotate in unison.

When the motor is de-energized and the driving member drops below the predetermined speed, the spring 56 contracts the free ends 51 of the weights inwardly and such action causes contraction of the clutch band 32 to thereby disengage the driving and driven members.

From the foregoing it can be seen that with a centrifugally operated clutch arrangement of the type described not only is it possible to start an electric motor under no load conditions to prevent damage to the same, but also to provide an effective means to prevent overloading of the motor at any time after it is operating at its rated speed to maintain a limit on the torque transmitted by the motor.

While I have herein described and on the drawing shown an illustrative embodiment of the invention, it is to be understood the invention is not limited thereto, but may comprehend other constructions, arrangements of parts, details and features without departing from the spirit of the invention.

It is claimed:

1. In a centrifugally operated torque limiting clutch: the combination of a rotatable driving member; a coaxial driven member including a drum; a pair of parallel pivot pins carried by said driving member remote from its axis of rotation; a pair of arcuate centrifugally operated weights each having a forward portion, pivotally mounted, one on each of said parallel pivot pins, with a central portion extending about the axis of said driving member and terminating in an end portion substantially opposite said forward portion; a radially extending arm formed integral with the forward portion of one of said weights; sector gears formed on the forward portions of each of said weights and held in mesh by said pins; an expansible clutch band for engaging the inner periphery of said drum and having opposite ends; means for anchoring one of said ends to said driving member adjacent said drum; and means for securing the other of said ends to said radially projecting arm on said centrifugally operated weight so that when said driving member exceeds a predetermined speed said weights are moved in unison by centrifugal force to expand said clutch band into engagement with said drum to rotate the same, and when an excessive loading is applied to said driven member said clutch band is moved against the action of said weights to permit slippage between said driving and driven members to thereby limit the torque transmitted through said clutch.

2. In a centrifugally operated torque limiting clutch, the combination of a rotatable driving member, a coaxial driven member including a drum, two parallel pivot pins carried by said driving member remote from its axis of rotation but equally spaced therefrom, two arcuate centrifugally operated weights each having a forward portion pivotally mounted on one of said pivot pins with a central portion extending about the axis of said driving member and terminating in an end portion substantially opposite said forward portion, said weights each having a sector gear formed integral on its forward portion and held in mesh by said pins, a radially extending arm formed integral with the forward portion of one of said weights, a spring adjacent the end portions of said centrifugal weights to return said weights to their normal inward position when said driving member is rotated below a predetermined speed, an expansible clutch band for engaging the inner periphery of said drum and having opposite ends, means for anchoring one of said ends to said driving member adjacent said drum, and means for securing the other of said ends to said radially projecting arm on said centrifugally operated weight so that when said driving member exceeds a predetermined speed said weights are moved in unison by centrifugal force to expand said clutch band into engagement with said drum to rotate the same and when an excessive loading is applied to said driven member said clutch band is moved against the action of said weights to permit slippage between said driving and driven members to thereby limit the torque transmitted through said clutch.

THOMAS R. SMITH.

References Cited in the file of this patent

UNITED STATES PATENTS

| Number | Name | Date |
|---|---|---|
| 1,481,593 | Fieux | Jan. 22, 1924 |
| 1,724,126 | Carrey | Aug. 13, 1929 |
| 2,065,040 | Baule | Dec. 22, 1936 |
| 2,101,878 | Snodgrass | Dec. 14, 1937 |
| 2,108,105 | Cotterman | Feb. 15, 1938 |

FOREIGN PATENTS

| Number | Country | Date |
|---|---|---|
| 755,898 | France | Dec. 1, 1933 |
| 471,302 | Germany | Jan. 17, 1929 |